(12) United States Patent
Rastogi et al.

(10) Patent No.: US 7,671,159 B2
(45) Date of Patent: Mar. 2, 2010

(54) PROCESS FOR THE PREPARATION OF A SHAPED PART OF AN ULTRA HIGH MOLECULAR WEIGHT POLYETHYLENE

(75) Inventors: Sanjay E. Rastogi, Eindhoven (NL); Kirti Garkhail, Eindhoven (NL); Robert Duchateau, Eindhoven (NL); Gerardus Johannes Maria Gruter, Heemstede (NL); Dirk Reinier Lippits, Geldrop (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 0 days.

(21) Appl. No.: 10/561,920

(22) PCT Filed: Jun. 26, 2003

(86) PCT No.: PCT/NL03/00473

§ 371 (c)(1), (2), (4) Date: Jan. 25, 2006

(87) PCT Pub. No.: WO2004/113057

PCT Pub. Date: Dec. 29, 2004

(65) Prior Publication Data

US 2006/0142521 A1    Jun. 29, 2006

(51) Int. Cl.
*C08F 110/02* (2006.01)

(52) U.S. Cl. .................................................... 526/352

(58) Field of Classification Search .................. 526/352
See application file for complete search history.

(56) References Cited

U.S. PATENT DOCUMENTS 5,721,334 A * 2/1998 Burstein et al. ............. 526/352
6,433,120 B1 * 8/2002 Rastogi et al. ............... 526/352

FOREIGN PATENT DOCUMENTS

WO     WO 03/037590 A    5/2003

OTHER PUBLICATIONS

Peter J. Barham et al, "A Neutron Scattering Study of the Melting Behaviour of Polyethylene Single Crystals", Polymer, 1991, vol. 32, No. 3, pp. 393-395.
Vega et al, "Rheology and reptation of linear polymers. Ultrahigh molecular weight chain dynamics in the melt," The Society of Rheology, Inc., May/Jun. 2004, pp. 663-678.

* cited by examiner

*Primary Examiner*—Ling-Siu Choi
(74) *Attorney, Agent, or Firm*—Nixon & Vanderhye P.C.

(57) ABSTRACT

The invention relates to a process for the manufacture of a shaped part of ultra high molecular weight polyethylene (UHMWPE) comprising melt processing, wherein a) the UHMWPE has a weight average molecular weight (Mw) of at least $1*10^6$ g/mol, b) during the shaping the storage plateau modulus of the UHMWPE (G*) is kept at a value of at most 1.5 MPa, c) whereafter, before the cooling, the G* is raised to its final value. The invention further relates to a shaped part obtainable with the process and the use of the shaped part in a medical application.

19 Claims, 1 Drawing Sheet

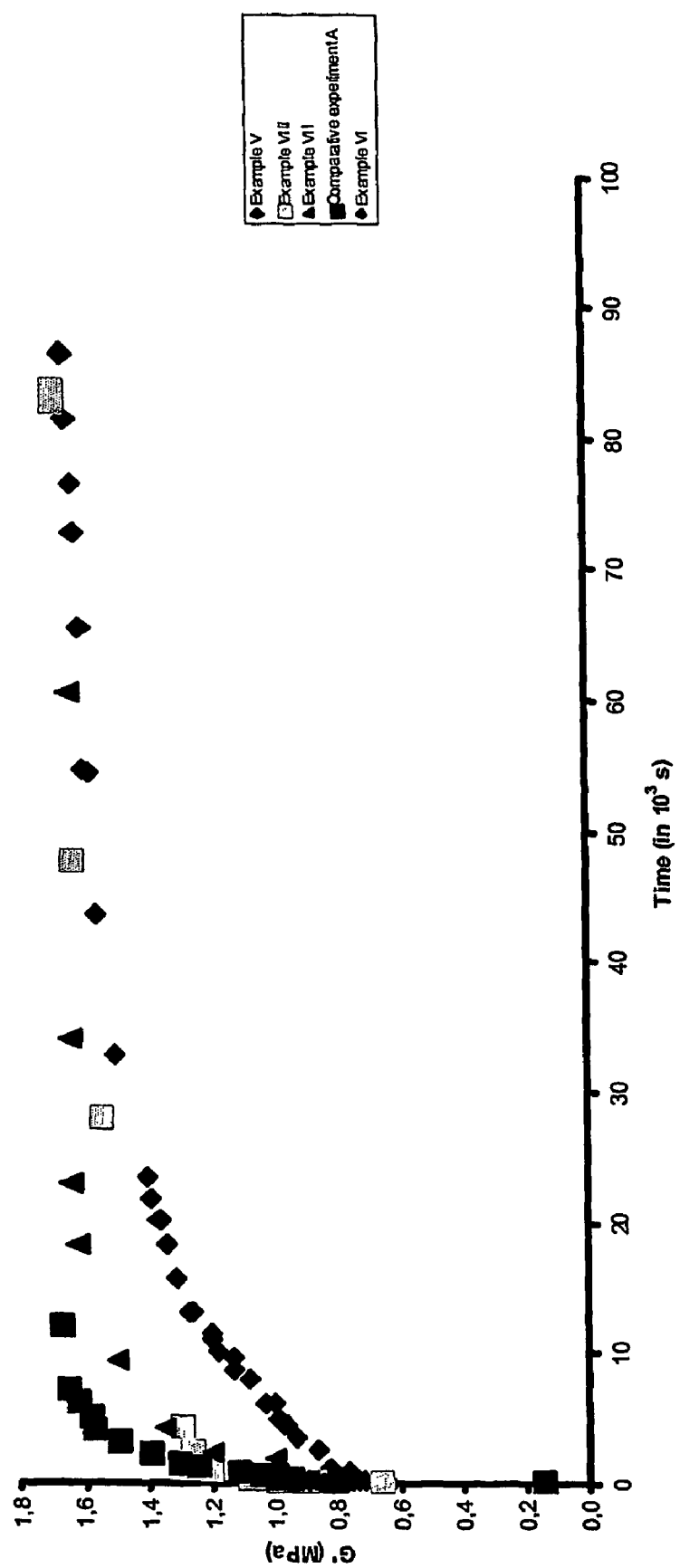
FIGURE 1/1

PROCESS FOR THE PREPARATION OF A SHAPED PART OF AN ULTRA HIGH MOLECULAR WEIGHT POLYETHYLENE

This application is the US national phase of international application PCT/NL2003/000473 filed 26 Jun. 2003 which designated the U.S., the entire content of which is hereby incorporated by reference.

FIELD OF INVENTION

The present invention relates to a process for the preparation of a shaped part of an ultrahigh molecular weight polyethylene (UHMWPE) by heating the UHMWPE to a temperature above the melting temperature, shaping the resulting melt, and cooling the melt to a temperature below the melting temperature. The invention further relates to a shaped part obtainable with this process, and to the use thereof, especially in medical applications.

BACKGROUND AND SUMMARY OF INVENTION

Such a process is known from WO 03/037590. In this publication a shaped part of UHMWPE is prepared wherein the UHMWPE is annealed for at least one hour at a temperature of between 130 and 160° C. in order to obtain a low chain entanglement and thus processability.

The processability of a synthetic polymer is often a compromise between the ease of processing and desired product properties. Processing routes conventionally applied in the polymer industry are injection moulding, extrusion and blow moulding. All these routes start from a melt of the polymer. Melt properties are mostly affected by the molecular mass of the polymer.

For a melt consisting of relatively low molecular mass polymer ($M_W < M_C$) there is a direct proportionality between zero-shear viscosity ($\eta_0$) and molecular mass, whereas for a melt consisting of high molecular mass polymer ($M_W > M_C$) the viscosity depends much more strongly on the molecular mass ($\eta_0 \sim (M_W)^{3,4}$). Herein is $M_W$ the weight averaged molecular mass and $M_C$ the critical molecular mass, which is related to the shortest polymer chain length able to form an entanglement. This difference in viscosity of the two molecular mass regimes is due to the ability of long chains to entangle, which imposes a restriction on the flowability of a melt.

The motion of chains within a highly entangled melt is described by the reptation model introduced by De Gennes in J. Chem. Phys. 55, p. 572 (1971). In this model a chain within a melt moves in worm-like fashion through a virtual tube, which is delineated by entanglements formed by neighbouring chains. The time needed for a chain to renew its tube (reptation time), i.e. to change its position within the melt is also highly dependent on molecular mass ($\tau_0 \sim M_W^3$). These fundamental restrictions make high molecular mass polymers rather intractable via conventional processing routes. On the other hand, final properties like tenacity, strength and wear improve with increasing molecular mass. Superior properties are necessary to meet the requirements of demanding applications.

The discrepancy between intrinsic properties related to high values of molecular mass and insufficient product performance due to difficulties in processing is encountered in UHMWPE as well as in other polymers of very high molecular mass. UHMWPE is a linear grade polyethylene, as is high-density polyethylene (HDPE), but possesses a weight average molecular mass (Mw) of at least $7,5 \cdot 10^5$ g/mol (according to ASTM D4020). Preferably the UHMWPE has a weight average molecular mass of at least $3 \cdot 10^6$ g/mol, because of excellent mechanical properties.

The density of the entanglements seems to play a prominent role in the process of forming a shaped part from the melt. The effect of entanglement density was confirmed by drawing experiments on single-crystal mats from UHMWPE, as reported by T. Ogita et al. in Macromolecules 26, p. 4646 (1993). In the case of melt crystallised UHMWPE, entanglements are trapped upon crystallisation and limit the extent to which the chains can be drawn. On the other hand, crystallisation of long molecular chains out of semi-dilute solutions leads to a much less entangled system and this enables these materials to be drawn below the melting temperature. It has always been believed that once a disentangled state of UHMWPE has been achieved, the formation of entanglements within the melt will be very slow, due to a long reptation time, and consequently one would be able to benefit from a disentangled state during processing. Experimental results however showed that highly disentangled solution crystallised films of UHMWPE, which are drawable below the melting temperature lose their drawability immediately upon melting. This phenomenon has been associated with that of "chain explosion", as experimentally assessed by P. Barham and D. Sadler in Polymer 32, p. 939 (1991). With the help of in-situ neutron scattering experiments they observed that the chains of highly disentangled folded chain crystals of polyethylene increase the radius of gyration instantaneously upon melting. Consequently the chains entangle immediately upon melting, which causes the sudden loss in processability and drawability once the sample has been molten.

These results showed that the fundamental restrictions resulting from the strong dependence of the zero-shear viscosity on molecular mass cannot be easily overcome. Simple disentanglement of the chains prior to melting will not lead to a less entangled melt and accordingly it cannot be used to improve the melt processability of UHMWPE.

The objective of the present invention is to provide a process for the manufacture of a shaped part of ultra high molecular weight polyethylene (UHMWPE) comprising melt processing, which part shows good processability below its melting point, and wherein the state of disentanglement is maintained long enough in the melt to process it as an only partly entangled melt.

According to the present invention this objective is achieved with a process wherein:
a) the UHMWPE has a weight average molecular weight (Mw) of at least $1 \cdot 10^6$ g/mol,
b) during the shaping the storage plateau modulus (G*) of the UHMWPE is kept at a value of at most 1.5 MPa,
c) whereafter, before the cooling, the G* is raised to its final value.

BRIEF DESCRIPTION OF THE DRAWINGS

FIG. 1 is the results of the G*-measurements of the UHMWPE (determined at a heating rate Θ 20 K/minute).

The G* is determined under nitrogen with a rotational viscometer (rheometer), using a parallel plate geometry (diameter 12 mm). Samples for rotational viscometry were made using compression moulding. The circular preforms having a diameter of about 8 mm and a thickness of 1 mm were moulded at a temperature of 50° C. Each two minutes the pressing force was increased in seven steps to a maximum of 50 kN. Oscillatory shear measurements were performed in a frequency range of 0.1-100Hz at 180° C.

With the process according to the invention a shaped part can be made by melt processing out of ultra high molecular weight polyethylene. The part thus formed is still highly drawable below its melting point, which indicates that, even though the UHMWPE under the specified conditions is processed in the melt, it still has a low entanglement density.

Surprisingly it has been found that when using the specified UHMWPE, under the specified conditions, a separate annealing step can be omitted. The process of increasing entanglement is under the conditions of the present invention so much retarded, that a disentangled thermodynamically metastable melt is present for a sufficient large time to process the material.

The time during which the entanglement increases, resulting in a build-up of the storage plateau modulus G* to a final value of around 2.0 MPa (which is indicative for a highly entangled UHMWPE), is in most cases depending on the heating rate ($\Theta$) of the polymer. When a dependence is observed, the build-up time increases with a decreasing $\Theta$. If an extended processing time window is required, it is preferred that $\Theta$ is at most 5 K/minute; even more preferred at most 1 K/minute.

Also the starting value of G* is therefore of importance. The lower the G* of the used UHMWPE, the longer it takes to achieve the G*=2.0 MPa value. Therefore it is preferred that the initial value of the G* of the used UHMWPE is at most 0.75 MPa. For a given polymerization with a specific catalyst system, the resulting G* starting value is typically lower with lower polymerization temperature. Although from a mechanical properties point of view, the desired G* end-value is 2.0 (fully entangled material), for processing the UHMWPE the G* must be below 1.5 MPa, more preferably below 1.2 MPa.

The G* build-up time can be extended or reduced by polymerization temperature and/or processing heating rate. In fact, the slower the build up of the G* value during the shaping, the better it is for the processability of the UHMWPE, as it retards the increase in entanglement. Therefore it is preferred that the speed (v) at which the G* builds up during shaping, is less than 3 MPa/hour, more preferred even less than 0.5 MPa/hour.

After the shaping, the value of the then achieved G* is raised to its final value of around 2.0 MPa. The speed at which this is done, can be as high as the situation allows. This can be achieved by increasing the heating rate. The final temperature should preferably not exceed 450 K.

An additional annealing step, as taught in WO 03/037590, will increase that build-up time and therefore enlarge the processing window between the initial G* and the highly entangled stage (having a G* of around 2.0 MPa). Preferably this annealing is performed at a temperature of not less than 398 K and not more than 410 K. For more details on this annealing step, the reader is referred to the above indicated patent publication.

The UHMWPE that is used in the process of the present invention has to fulfill at least the following criteria:
the weight average molecular weight (Mw) is at least $1*10^6$,
the storage plateau modulus (G*) is kept at a value of at most 1.5 MPa during the shaping.

This requires specific conditions for the polymerization process in which the UHMWPE is made:
the temperature at which the polymerization takes place is between 225 and 325 K, more preferably between 260 and 305 K. The higher the temperature, the higher the G*-value of the resulting UHMWPE;

The catalyst is an unsupported single-site catalyst or a mixture of unsupported single-site catalysts, known for the polymerization of ethylene to UHMWPE;
The catalyst concentration is low: less than $1*10^{-4}$ mol/l, more preferred less than $1*10^{-5}$ mol/l.
The polymerization temperature is lower than 325 K and preferably lower than 300 K.
As of this nature, the polymerization takes place initially in solution and after formation and precipitation of polymer in suspension.

The UHMWPE can either be a homopolymer of ethylene, or a copolymer of ethylene with a comonomer in the form of another $\alpha$-olefin or a cyclic olefin. Examples of such a comonomer are: propylene, 1-butene, 1-pentene, 1-hexene, 4-methyl-1-pentene, 1-octene, (substituted) norbornenes and the amount of incorporated comonomer should be sufficiently low to ensure that the polymer still crystallizes under polymerization conditions. Through simple experimentation the skilled man is able to find the suitable process conditions that result in the preparation of the UHMWPE fulfilling the above stipulated criteria. Preferably, the MWD of the UHMWPE lies between 1.2 and 3.0, more preferred between 1.2 and 2.5.

The invention also relates to a shaped part that is obtainable with the process of the present invention, as well as to the use of the shaped part. The shaped part can be in the form of a filament, a film, a moulded or extruded article. The processes to obtain such a shaped part from the polymer meet are known to the skilled artisan.

As the shaped parts according to the present invention have enhanced toughness, wear and abrasion resistance, reduced oxygen permeability, and are essentially grain boundary free, they are very well suited for the use in a medical application. Preferably the shaped part can thus be used as an element of a hip or knee prosthesis.

Also other uses, wherein the improved physical and mechanical properties of the shaped are applicable, can be referred to, like the use of the UHMWPE-based shaped part in bearings.

The invention is elucidated with the following non-limiting Examples and comparative experiments.

EXAMPLES I-IV AND COMPARATIVE EXPERIMENT A

An UHMWPE was prepared according to Example XXV of EP-A-1,057,837. The product had an initial G* of 0.6 MPa, an MWD of 2 and an Mw of $4*10^8$ (according to ASTM D4020).

A sample thereof was molten in a rheometer (Ares 3LS-4A, Rheometrics Inc.) and heated with different heating rates from 398 to 418 K. The increase of the storage plateau modulus G* (recorded at 10 rad/s) was followed in relation to different heating rates $\Theta$.

The results are given in Table 1.

TABLE 1

| | | Example | |
|---|---|---|---|
| Exp. | $\Theta$ (K/min) | G* after 8,000 sec. (MPa) | G* after 16,000 sec. (MPa) |
| I | 0.25 | 0.7 | 0.8 |
| II | 1.00 | 1.0 | 1.1 |
| III | 5.00 | 1.3 | 1.5 |
| A | 20.00 | 1.7 | 1.8 |

EXAMPLE IV AND COMPARATIVE EXPERIMENT B

The UHMWPE of Example I was heated to a temperature of 453 K at different heating rates Θ. The G*-value was recorded (at 10 rad/s) vs. time. The results are given in Table 2.

TABLE 2

| Exp. | Θ (K/min) | G* after 10,000 sec. (MPa) | G* after 80,000 sec. (MPa) |
|---|---|---|---|
| IV | 0.25 | 0.8 | 0.9 |
| B | 20.00 | 1.7 | 1.9 |

The products from comparative experiments A and B had a poor drawability, resulting from their high G*-value. The products from the Examples I-IV were very well drawable, due to their low G*-value ($\leq$1.5 MPa).

EXAMPLES V TO VIII

Experimental:

All air-and/or water-sensitive activities were performed under an argon atmosphere using Schlenk techniques or in a conventional nitrogen-filled glove box (Braun MB-150 GI). Methylalumoxane was purchased from WITCO GmbH as a 10 wt % toluene solution. Ethylene was obtained from Air Liquide. Petroleum-ether (40-60), used as the polymerization solvent, was dried over $Al_2O_3$. The catalysts [3-tBu-2-O—$C_8H_3CH=N(C_6F_5)]_2TiCl_2$ and $(C_5Me_5)_2Sm(THF)_2$ were synthesized according to the literature. The molecular weight and molecular weight distribution was measured at 135° C. by gel-permeation chromatography (GPC; GPC210, Polymer Labs) using 1,2,4-trichlorobenzene as solvent.

Polymerizations:

EXAMPLES V AND VI

Catalyst if $(C_5Me_5)_2Sm(THF)_2$

The polymerizations were carried out at –10 and 0° C., respectively, under atmospheric pressure using a 2000 ml round bottom flask, equipped with a thermocouple and a mechanical stirrer. Petroleum ether (1000 ml) was introduced to the argon-purged reactor after which the solvent was saturated by bubbling ethylene into the solution for 45 minutes at –10° C. and 0° C. resp. The polymerization was initiated by addition of a toluene solution of catalyst (2.8 µmol) into the reactor while stirring vigorously. The same amount of catalyst was added ten times at an interval of one minute. The polymerization was quenched after 15 min with methanol. The solid UHMWPE was recovered by filtration, washed with water and acetone and dried (vacuum oven 60° C., overnight).

EXAMPLES VII AND VIII

Catalyst is [3-tBu-2-O—$C_6H_3CH=N(C_6F_5)]_2TiCl_2$

The polymerizations were carried out under atmospheric pressure using a 2000 ml round bottom flask, equipped with a thermocouple and a mechanical stirrer. Petroleum ether (1000 ml) was introduced to the argon-purged reactor after which the solvent was saturated by bubbling ethylene into the solution for 30 minutes at –10° C. and +20° C., respectively. The polymerization was initiated by addition of a toluene solution of methylalumoxane (20 ml) after which a toluene solution of the catalyst (1 µmol) was introduced into the reactor while stirring vigorously. After 20 minutes the ethylene feed was stopped and isobutyl alcohol was added to terminate the polymerization. HCl and water were added to the resulting mixture. The solid UHMWPE was recovered by filtration, washed with water and acetone and dried (vacuum oven 60° C., overnight).

| Example | Catalyst | Synthesis temp (° C.) | Mw | Mn | MWD 10 |
|---|---|---|---|---|---|
| V | Sm | –10 | 1,225,500 | 607,700 | 2.0 |
| VI |  | 0 | 2,040,500 | 832,856 | 2.5 |
| VII | Ti | –10 | 1,066,000 | 840,600 | 1.3 |
| VIII |  | +20 | 1,089,000 | 794,800 | 1.4 |

The invention claimed is:

1. Process for the preparation of a shaped part of an ultrahigh molecular weight polyethylene (UHMWPE) by heating the UHMWPE to a temperature above the melting temperature, shaping the resulting melt, and cooling the melt to a temperature below the melting temperature, wherein
    a) the UHMWPE has a weight average molecular weight (Mw) of at least $1\times10^6$ g/mol;
    b) during the shaping the storage plateau modulus (G*) of the UHMWPE is kept at a value of at most 1.5 MPa,
    c) whereafter, before the cooling, the G* is raised to its final value.

2. Process according to claim 1, comprising heating the UHMWPE at a heating rate (Θ) which is at most 1 K/minute, as of a temperature of 350K.

3. Process according to claim 1, comprising heating the UHMWPE at a heating rate (Θ) which is at most 5 K/minute.

4. Process according to claim 2, wherein the MWD is between and inclusive 1.2-3.0.

5. Process according to claim 1, wherein the initial value of G* is at most 0.75 MPa.

6. Process according to claim 1, wherein G* builds up to a value of 1.5 MPa at a speed (Ψ) less than 3 MPa/hour.

7. Process according to claim 6, wherein Ψ is less than 0.5 MPa/hour.

8. Process according to claim 1, wherein the UHMWPE is obtained through a solution or suspension polymerization at a temperature of between 225 and 325 K, using an unsupported catalyst in a concentration of less than $1\times10^{-4}$ mol/L.

9. Process according to claim 1, wherein the UHMWPE is either a homopolymer of ethylene, or a copolymer of ethylene with another α-olefin or cyclic olefin.

10. Process according to claim 8, wherein the polymerisation takes place at a temperature between and inclusive 260 and 305 K.

11. Process according to claim 1, wherein the UHMWPE is annealed during the heating, at a temperature of not less than 398 K and not more than 410 K.

12. Process for the production of a shaped part of an ultrahigh molecular weight polyethylene (UHMWPE) comprising the steps of:
    (a) heating at a heating rate (Θ) which is at most 1 K/minute an ultrahigh molecular weight polyethylene (UHMWPE) having a weight average molecular weight (Mw) of at least $1\times10^6$ g/mol; and having an initial storage plateau modulus (G*) value of at most 0.75 MPa to a temperature above the melting temperature of the UHMWPE to form a processable melt thereof;

(b) allowing the initial G* value of the UHMWPE melt to build at a speed ($\Psi$) of less than 3 MPa/hour to a processing G* value of at most 1.5 MPa;

(c) shaping the melt of the UHMWPE while maintaining the processing G* value of at most 1.5 MPa to form a shaped part thereof; and thereafter (d) prior to cooling, raising the G* value of the shaped part formed according to step (c) from a G* value of at most 1.5 MPa to a final G* value of about 2.0 MPa; and then (e) cooling the shaped part.

13. Process according to claim 12, wherein step (a) is practiced by heating the UHMWPE at a heating rate ($\Theta$) which is at most 5 K/minute.

14. Process according to claim 12, wherein the UHMWPE has a molecular weight distribution (MWD) of between 1.2-3.0, inclusive.

15. Process according to claim 12, wherein step (b) is practiced by allowing the initial G* value of the UHMWPE to build at a speed ($\Psi$) of less than 0.5 MPa/hour.

16. Process according to claim 12, wherein the UHMWPE is the solution or suspension polymerization product obtained at a polymerization temperature of between 225 and 325 K, using an unsupported catalyst in a concentration of less than $1 \times 10^{-4}$ mol/L.

17. Process according to claim 16, wherein the polymerisation takes place at a temperature between and inclusive 260 and 305 K.

18. Process according to claim 12, wherein the UHMWPE is either a homopolymer of ethylene, or a copolymer of ethylene with another α-olefin or cyclic olefin.

19. Process according to claim 12, wherein the heating step (a) includes annealing the UHMWPE at a temperature of not less than 398 K and not more than 410 K.

* * * * *